United States Patent [19]
Heath et al.

[11] Patent Number: 4,760,386
[45] Date of Patent: Jul. 26, 1988

[54] AUTOMATIC HIDING AND REVEALING OF A POINTER DURING KEYBOARD ACTIVITY

[75] Inventors: Allen W. Heath, Cedar Park; Ronald K. Sheppard, Austin, both of Tex.

[73] Assignee: International Business Machines Corporation, Armonk, N.Y.

[21] Appl. No.: 873,757

[22] Filed: Jun. 13, 1986

[51] Int. Cl.[4] ............................................. G09G 1/00
[52] U.S. Cl. .................................... 340/709; 340/710; 340/711
[58] Field of Search ............... 340/706, 707, 708, 709, 340/710, 711, 712, 724; 178/18

[56] References Cited

U.S. PATENT DOCUMENTS

| | | | |
|---|---|---|---|
| 4,370,645 | 1/1983 | Cason et al. | 340/709 |
| 4,464,652 | 8/1984 | Lapson et al. | 340/710 |
| 4,565,999 | 1/1986 | King et al. | 340/706 |
| 4,661,810 | 4/1987 | Himelstein et al. | 340/709 |

FOREIGN PATENT DOCUMENTS 59-116841  7/1984  Japan .
2161755  1/1986  United Kingdom .

OTHER PUBLICATIONS

*Research Disclosure*, 243019, (Anonymous Publication), "Display Screen Touch Device", (Jul. 10, 1984), (abstract only).
*Research Disclosure*, 256036, (Anonymous Publication), "Run-Time Configuration of Device Dependent Screens", (Aug. 10, 1985), (abstract only).

*Primary Examiner*—Gerald L. Brigance
*Attorney, Agent, or Firm*—Douglas H. Lefeve

[57] ABSTRACT

A pointer controlled by a pointing device, such as a mouse, is temporarily removed from a visual display screen when a first character is being updated on the screen. The pointer is left hidden from the screen until the event causing screen updating has been idle for a predetermined period of time. The pointer is not removed from the screen if the keystroke or other hiding event is invalid in the current context of the application program. The pointer is also immediately redisplayed if an event associated with the pointing device, such as either pointing device movement of pointing device button clicking, is detected.

20 Claims, 6 Drawing Sheets

AUTOMATIC HIDING AND REVEALING OF A POINTER DURING KEYBOARD ACTIVITY

TECHNICAL FIELD

This invention relates to data processing systems in general and more particularly to a data processing system in which a keyboard controlled cursor and a pointer controlled by a pointing device can coexist on a visual display device.

BACKGROUND ART

In computer systems employing a visual display device and a keyboard there is usually a moveable marker on the screen of the visual display device known as a cursor, which denotes the location which the next action taken by the keyboard will affect. For example, in word processing applications the cursor position on the visual display device usually denotes the location at which the next symbol generated by the keyboard will be entered into the document. However, while the cursor is currently associated with a symbol which has previously been keyed, the keyboard selection of a "delete" function will remove the character then associated with the cursor.

In virtually all prior art keyboard/display applications, whether used in a nonintelligent terminal environment or in a standalone, high performance computer application, the keyboard has included a plurality of keys which are used to move the position on the visual display, without otherwise affecting the displayed information. These keys, known as cursor motion keys, were sometimes dedicated only to this function, while in other systems, were used as cursor motion keys only while another key was depressed or toggled to shift the function of these keys from another function such as numeric keys or character keys to the cursor motion function.

Cursor motion keys have typically moved the cursor position in increments on the visual display device. These key have typically moved the cursor one character position to the left or right for each short depression of the horizontal motion keys and one line position up or down for each short depression of the vertical cursor motion keys. In many systems a longer depression of a cursor motion key results in repetitive, but incremental movement of the cursor position on the visual display device.

Many computer programs used in conjunction with keyboards and visual display devices provide additional flexibility with the use of cursor motion keys. More specifically, these programs have provided greater direct incremental movements of the cursor position than the previous movements of single character positions or a rapid succession of single character movements. For example, word processing programs have provided the capability to advance the cursor from any position along a horizontal line of text to either the beginning of that line or the end of that line by depression of an additional control key before the cursor motion key is depressed. Similarly, some word processing programs have provided for cursor movements by word, by paragraph, or by page in a similar manner. In each of these cases, the cursor movement was from an undefined location to a logically finite point. It has not been known to use cursor motion keys to move the cursor from such an unknown location to another random location in a direct movement. For such a movement to the second, random location, it has been necessary when using cursor motion keys to increment the cursor in one coordinate direction until that coordinate of the random point has been reached and then increment the cursor in the other coordinate direction until the second coordinate of the random location of the cursor has been reached.

In addition to the cursor motion keys there exists a class of pointing devices which let one move a pointer on the visual display device in a rapid, direct manner, rather than by incremental movements. One example of this class of devices has come to be commonly referred to as a "mouse". These devices have come to be used to allow an operator to rapidly point to an operation, command, function, or option named on the display which is desired to be selected by the clicking of a button associated with the pointing device. This pointing device has also been used with the button associated therewith to rapidly move a pointer from the beginning to the end of a block of data to be marked for further processing, such as moving the data, copying the data, or deleting the data. Additionally, the pointer has been used in the prior art to rapidly change the position of a cursor by a direct movement, rather than the incremental movement of the cursor motion keys.

For the purposes of simplifying the remaining description of this invention, the mouse will be used as the example of the above described class of pointing devices, although those skilled in the art will recognize that this invention is also applicable to the display of pointers controlled by other pointing devices such as, but not limited to, joysticks, tablets, and light pens.

When a mouse and the visual pointer associated therewith are included in a data processing system, it has been a common practice to maintain the simultaneous displaying of both the cursor, which is normally moved with the cursor motion keys, and the mouse pointer. When used in conjunction with an application such as a word processing program, the cursor controlled by the cursor motion keys always denotes the position at which the next editing operation (including the insertion and deletion of characters and controls) occurs. The mouse pointer has been used to mark blocks of text, to rapidly reposition the cursor, and to point to displayed commands for selection.

A problem arises, when using a system in which a mouse pointer is included in addition to the traditional cursor, regarding the manner of displaying the additional mouse pointer on the display during keyboard operations. Specifically, the question presented is what should happen to the mouse pointer during keyboarding? If it is desirable to leave the mouse pointer on the visual display screen most of the time, it must be taken away at least during input of each character, because a new character being inputted may need to be placed on the screen in the same position as is being currently occupied by the mouse pointer. If the desire is to leave it on the screen but have it removed during the actual keying process, then it must be redisplayed when keying ceases. This presents a number of problems. First, it is visually distracting to the operator to see the flickering that occurs between the keying of each character as the mouse pointer is removed upon detection of the keystroke and then redisplayed as soon as the keyed character is displayed. Second, the requirement to immediately redisplay the mouse pointer after the display of each keyed character results in a severe performance requirement for the hardware and software.

Because of the above problems the most common solution has been to permanently remove the mouse pointer at the first keystroke until the mouse, itself, is moved. This, however, causes additional problems. First, when it is desired to again use the mouse while it is currently hidden from view, it might be found that the mouse is presently positioned exactly where the operator wants it. However, the operator does not know that because the mouse pointer has been hidden and to see the mouse pointer position, the mouse must first be moved which, of course, moves the mouse pointer away form the desired position. Another problem is that of having the operator see the mouse pointer disappear at the first keystroke which leaves the impression that something wrong has happened to the system. The operator may not know why the mouse pointer disappeared and may begin trying various corrective action, only to again be startled to see the mouse pointer reappear at the first movement of the mouse, itself.

In view of the above, in systems that use both cursor motion keys to direct movement of a cursor on a visual display and a mouse to allow rapid, direct movements of a mouse pointer, it would be highly desirable to allow the operator to periodically be conscious of the mouse pointer position without the flickering or performance impact inherent with techniques which immediately redisplay the mouse pointer after each keystroke.

SUMMARY OF THE INVENTION

Accordingly, with the present invention the mouse pointer is temporarily removed from the visual display screen when the first character is being updated on the screen. The mouse pointer is left hidden from the screen until the keyboard has been idle for a predetermined period of time. This predetermined period of time may be chosen within a range of time constants; however, a number of considerations must be balanced. From one extreme to the other, too short a time period requires too much system resource and introduces the annoying flicker. A slightly longer time period results in operator nervousness and exhaustion in attempting to keep the mouse pointer from reappearing on the screen and therefore avoid the flicker described above. The optimum time period is short enough to encourage the operator to type to keep the mouse pointer from reappearing on the display screen, which actually produces improved operator performance. At the other end of the time extreme, too long a delay period gives the appearance to the operator that the computer system is very slow or that the mouse pointer is no longer working, as the mouse pointer remains invisible from the screen for an unduly long time.

Considering these sometimes conflicting considerations, we have found that a time delay of approximately 1.5 seconds from the last keystroke to the reappearance of the mouse pointer yields substantially the most optimum compromise.

The foregoing and other objects, features, extensions, and advantages of the invention will be apparent from the following more particular description of preferred embodiments of the invention as illustrated in the accompanying drawings.

BEST MODE FOR CARRYING OUT THE INVENTION

Figure 1:
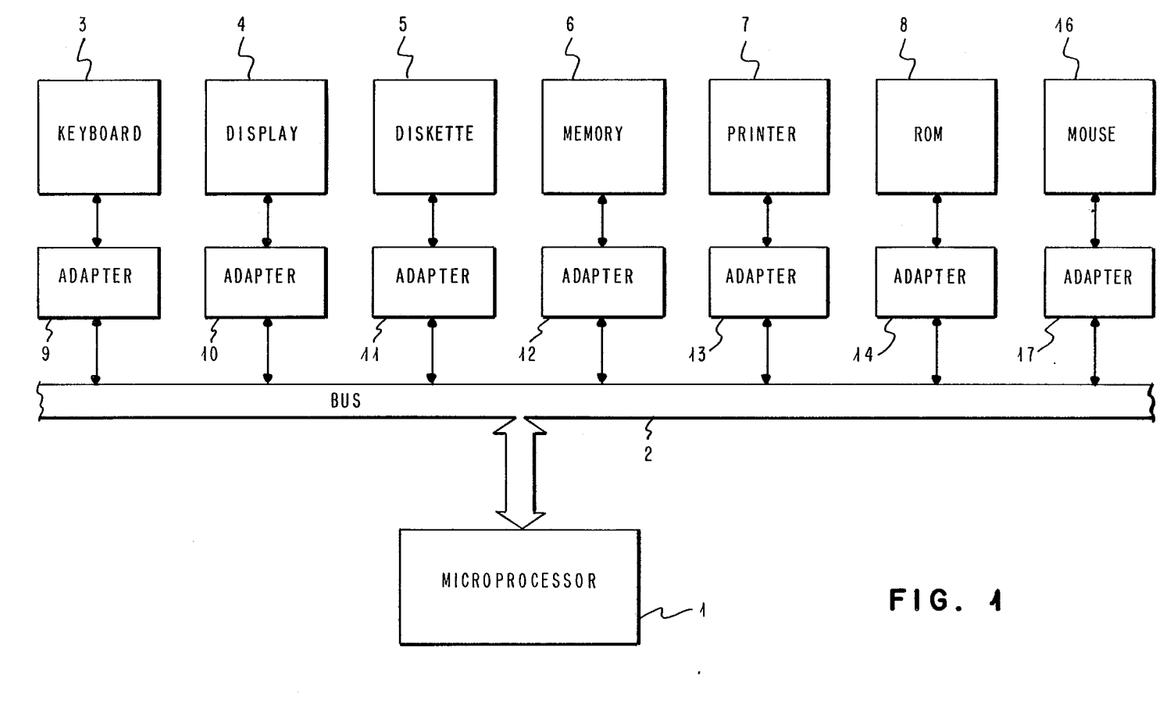
FIG. 1 is a block diagram of a data processing system which includes a stored program for performing the function of this invention in conjunction with the data processing system.

Beginning with reference to the block diagram of FIG. 1, a typical personal computer architecture is shown, such as the configuration used in the IBM Personal Computer. The focal point of this architecture comprises a microprocessor 1 which may, for example, be an Intel 8088 or similar microprocessor. The microprocessor 1 is connected to a bus 2 which comprises a set of data lines, a set of address lines and a set of control lines. A plurality of I/O devices or memory or storage devices 3–8 and 16 are connected to the bus 2 through separate adapters 9–14 and 17, respectively. For example, the display 4 may be the IBM Personal Computer Color Display and the adapter 10 may, accordingly, be the IBM Color/Graphics Adapter. The other devices 3 and 5–8 and adapters 9 and 11–14 are either included as part of an IBM Personal Computer or are available as plug-in options from the IBM Corporation. The Mouse 16 and adapter 17 are, for example, available from the Microsoft Corporation as the Microsoft Mouse, bus version. The random access memory (RAM) 6 and the read-only memory (ROM) 8 and their corresponding adapters 12 and 14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. The BIOS controls the fundamental operations of the computer. An operating system such as the IBM Personal Computer Series Disk Operating System by Microsoft Corporation, or DOS, most commonly used with the IBM Personal Computer family, is loaded into the memory 6 and runs in conjunction with the BIOS stored in the ROM 8. It will be understood by those skilled in the art that the personal computer system could be configured so that parts or all of the BIOS are stored in the memory 6 rather than in the ROM 8 so as to allow modifications to the basic system operations by changes made to the BIOS program, which would then be readily loadable into the random access memory 6.

An application program such as the IBM Display-Write 3 word processing program may also be loaded into the memory 6 to provide instructions to the microprocessor 1 to enable a comprehensive set of word processing tasks, including the creation and revision of text documents, to be performed by the personal computer system shown in FIG. 1. An application program loaded into the memory 6 is said to run in conjunction with the disk operating system previously loaded into the memory 6.

Figure 2:
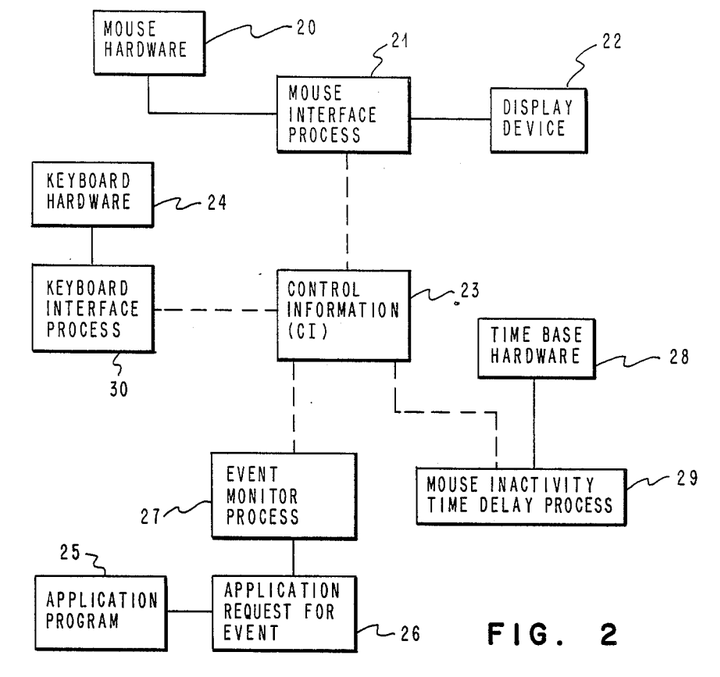
FIG. 2 is an overview diagram of the data processing system asynchronous process interaction which occurs when utilizing this invention.

Refer now to FIG. 2 for an overview diagram of the data processing system process interaction which occurs when utilizing this invention. The Mouse Interface process 21, the Keyboard Interface process 30, and the Mouse Inactivity Time Delay process 29 may all occur asynchronously to each other. Each of these three processes 21, 30, and 29 have access to a portion 23 of the system RAM 6 in which various types of control information (CI) is stored.

When using a computer such as the IBM Personal Computer for the system shown in FIG. 1, the mouse hardware 20 may, for example, comprise the Microsoft Mouse. This mouse is available in either a serial version, which plugs into an Asynchronous Communications Adapter available for the IBM Personal Computer, or in a bus version which includes an adapter card which plugs into an accessory slot in the IBM Personal Computer. The Mouse Interface process 21 is described in detail in FIG. 5. The display device 22 may comprise the display 4 and adapter 10 described above relative to the IBM Personal Computer.

Figure 4:
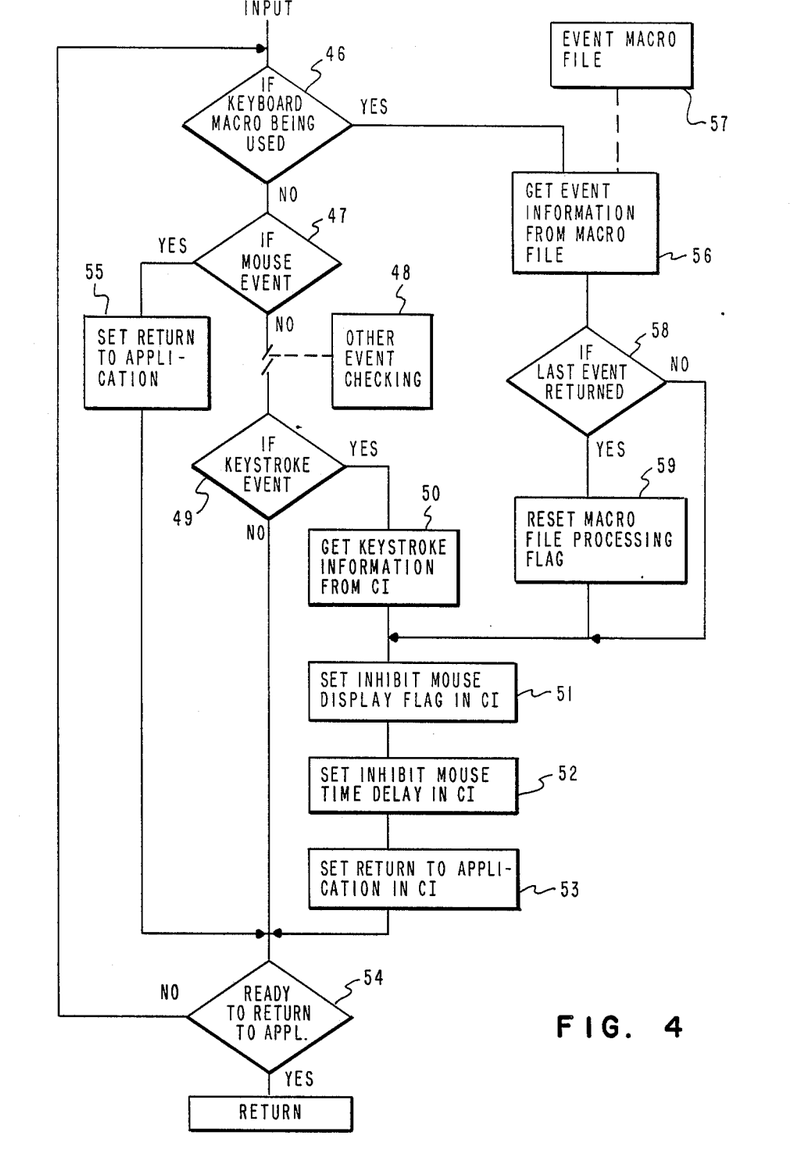
FIG. 4 is a flow diagram of the Event Monitor process of FIG. 2.

The Event Monitor process 27 is described in detail in FIG. 4. The Keyboard Interface process 30 controls the keyboard hardware comprising the keyboard 3 and adapter 9 of FIG. 1. This invention is used in the context of the operation of an application program, such as the IBM DisplayWrite 3 word processing program, denoted by block 25. Any such application program at times requests at block 26 the next detection of an event, such as a keystroke provided by the keyboard through the Event Monitor process 27.

Figure 6:
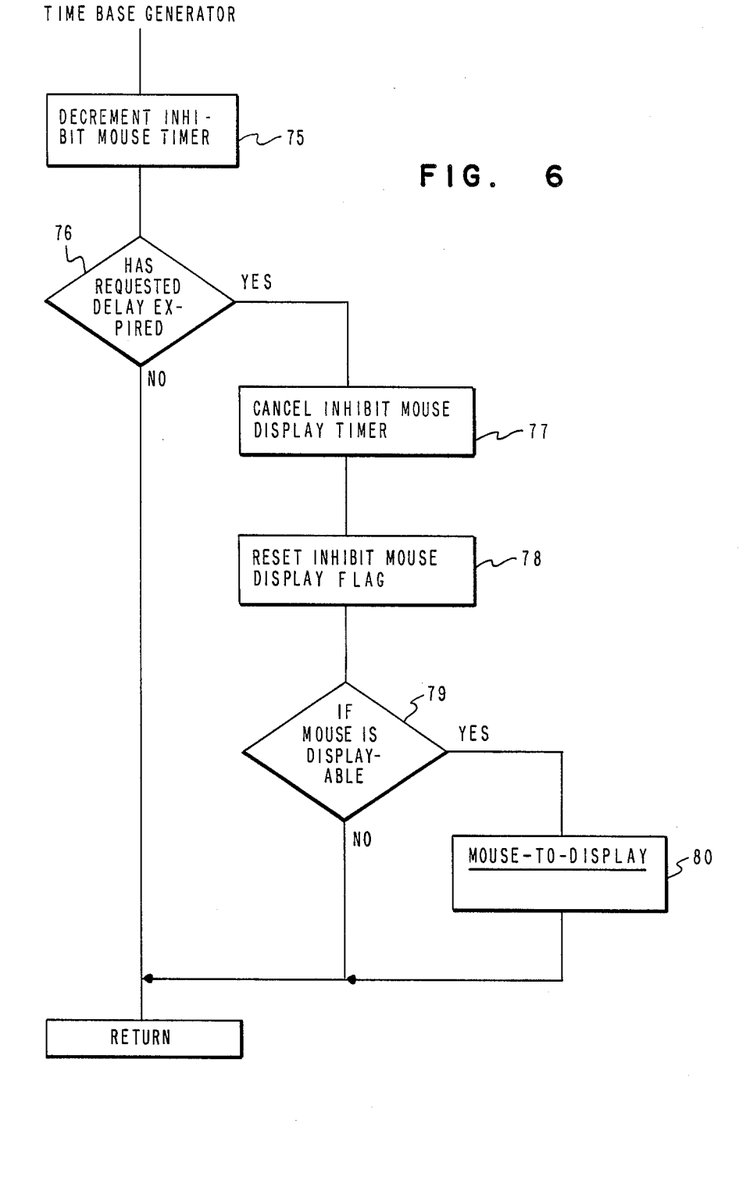
FIG. 6 is a flow diagram of the Mouse Inactivity Time Delay process of FIG. 2.

The mouse inactivity time delay process 29 is utilized in hiding the mouse from the screen during keyboard activity as is explained in detail relative to FIG. 6. The time base hardware 28 may be a dedicated hardware timer, such as one timer channel within an Intel 8253 Programmable Interval Timer or this hardware 28 may build upon a recurring timer interrupt such as the "user timer tick" interrupt X'1C' documented in the IBM Personal Computer Technical Reference, assuming such a computer is used for this embodiment.

Figure 3:
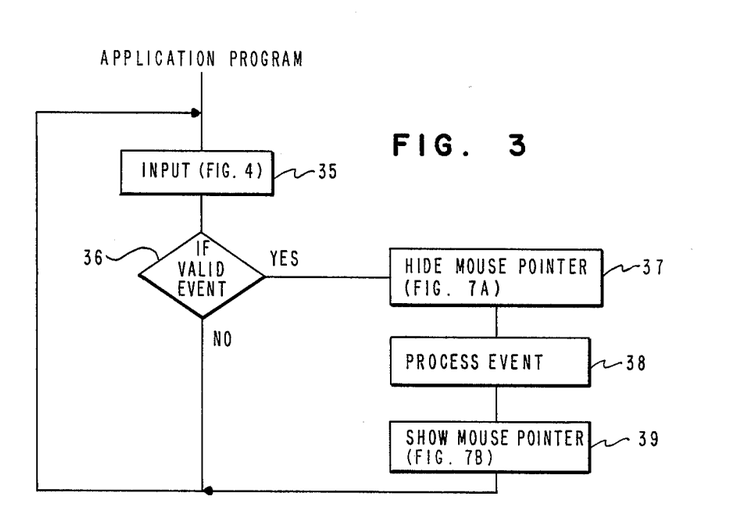
FIG. 3 is a flow diagram of the operation of hiding the mouse pointer for a valid event for which it should be hidden.

Refer now to FIG. 3 for a high level overview of the steps which occur in the process of hiding the mouse pointer for a predetermined period of time. First, at block 35 an event, such as a keystroke, is detected. This process will be described in detail relative to FIG. 4. At block 36 the event is tested to determine whether the detected event is appropriate for input to the application at this time. Assuming that the event is appropriate, the event is determined to be valid, and at block 37 the process of FIG. 7a to hide the mouse pointer is entered. At block 38 the application program processes the event, which, for this example, was the keystroke detected at block 35. This process, for example, may be to insert a character into a text document and to update the displayed representation of the document. At block 39, after the event has been completely processed, the pointer is allowed to be shown on the visual display screen. The operation then proceeds back to block 35 to get the next event. At block 36, if the event detected is not valid at this point in the application, then the operation immediately loops back to block 35 to get the next event.

It will be understood that while it is desirable to temporarily remove the mouse pointer during actions which may conflict with its position on the visual display screen (such as keyboarding) if the actions being returned are invalid for the application program, it is then desirable to not hide the mouse pointer during these action so that the operator will understand that the actions are invalid. For this reason the test at block 36, FIG. 3, exists.

The following programming design language listing is another form of the description of the above operation of hiding the mouse pointer for a valid event. This listing parallels the operation described above for FIG. 3.

---

LOOP:

Call INPUT;
Validate the event;
IF the event is valid THEN
Perform any preprocessing necessary (such as determining the position to insert a keystroke character);
Call HIDE_MOUSE to remove the mouse from the display;
Update the display device to reflect acceptance of the input event;
Call SHOW_MOUSE to enable reshowing the mouse on the display device;
Perform any postprocessing necessary (such as media access);
ENDIF;

GOTO LOOP to get the next event;

---

Referring now to FIG. 4 the Event Monitor Process is shown in detail. The process is begun by realizing that the application program is ready to accept the next event. The first test is at block 46 to determine if the event is to come from an event macro file such as a captured sequence of keystrokes that can be played back on demand, by the depression of a single keyboard key such as a function key. Assume for now that the event detected is not a keyboard macro being processed. The operation then proceeds to block 47 for a test to determine if the event is a mouse event. Assume for now that the event is not a mouse event. Other additional tests for other events may be checked during this sequence of tests as denoted by block 48.

At block 49 the event is tested to determine if it is a keystroke event. Assuming that the event is a keystroke event, the keystroke information, previously written to the CI 23 by the Keyboard Interface process 30 (FIG. 2), is fetched for return to the application program. Next, at block 51 an Inhibit Mouse Pointer Display flag is set in the CI 23 which starts the Mouse Inactivity Time Delay process 29. At block 52 an Inhibit Mouse Pointer time delay value is set in the CI 23 which starts the Mouse Inactivity Time Delay process 29. Then, at block 53 a return to application flag is set in the CI 23. At this point the operation of the keyboard monitor process returns back to the application program after this processing of a single keystroke.

If no event was detected at block 49 the operation proceeds to block 54 for a test of readiness to return to the application. If the application requires further waiting for an event, the operation loops back to block 46. However, the application may desire an immediate return thereto if no event is detected.

Assume now that, rather than a keystroke or keyboard macro event, a mouse event was detected. In this case, of course, it is undesirable to perform any hiding of the mouse pointer, since for a mouse event the operator would normally want to see the mouse pointer position. In this case, at block 47 the operation proceeds to block 55 and the Return to Application flag in the CI 23 is set.

Assume now in FIG. 4 that a keyboard macro was the event detected at the test in block 46. In this case, at block 56 a macro file 57 is queried to read the information therefrom to the application program. As soon as this information is obtained for the application program a test is made at block 58 to determine if the last event from the macro file has been returned to the application program. If not, the operation proceeds to block 51 to enter the process of inhibiting the display of the mouse pointer. When the final event has been returned from the macro file then the operation proceeds from block 58 through block 59 to reset the Macro File Processing flag. The operation then again proceeds to block 51 for continuing to inhibit the display of the mouse pointer relative to the last event in the macro file.

The following programming design language listing is another form of the description of the operation of the Event Monitor process. This listing parallels the operation described above for FIG. 4.

```
BEGIN Procedure INPUT (FLAG Return_to_Application)
Returns EVENT;
UNTIL Return_to_Application is ON DO
IF SWITCH Event_Macro_File is ON THEN
Get the next EVENT from the Event_Macro_file;
IF Last_event from Event_Macro_File THEN
Set SWITCH Event_Macro_file OFF;
ENDIF;
Set SWITCH Inhibit_Mouse_Display ON;
Set TIMER Inhibit_Mouse_Timer to Delay_Period;
Start Timer_Process;
Set SWITCH Return_to_Application ON;
ELSE
IF EVENT is a Mouse type event THEN
Get the Mouse EVENT information from
the system mouse input buffer;
Set SWITCH Return_to_Application ON;
ELSE
.
. (other event classification checks)
.
IF EVENT is a Keystroke type event THEN
Get the Keystroke EVENT informa-
tion from the system keystroke
input buffer;
Set SWITCH Inhibit_Mouse_Display
ON;
Set TIMER Inhibit_Mouse_Timer to Delay_Period;
Start Timer_Process;
Set SWITCH Return_to_Application
ON;
ENDIF;
ENDIF;
ENDIF;
ENDDO;
END Procedure INPUT;
```

Figure 5:
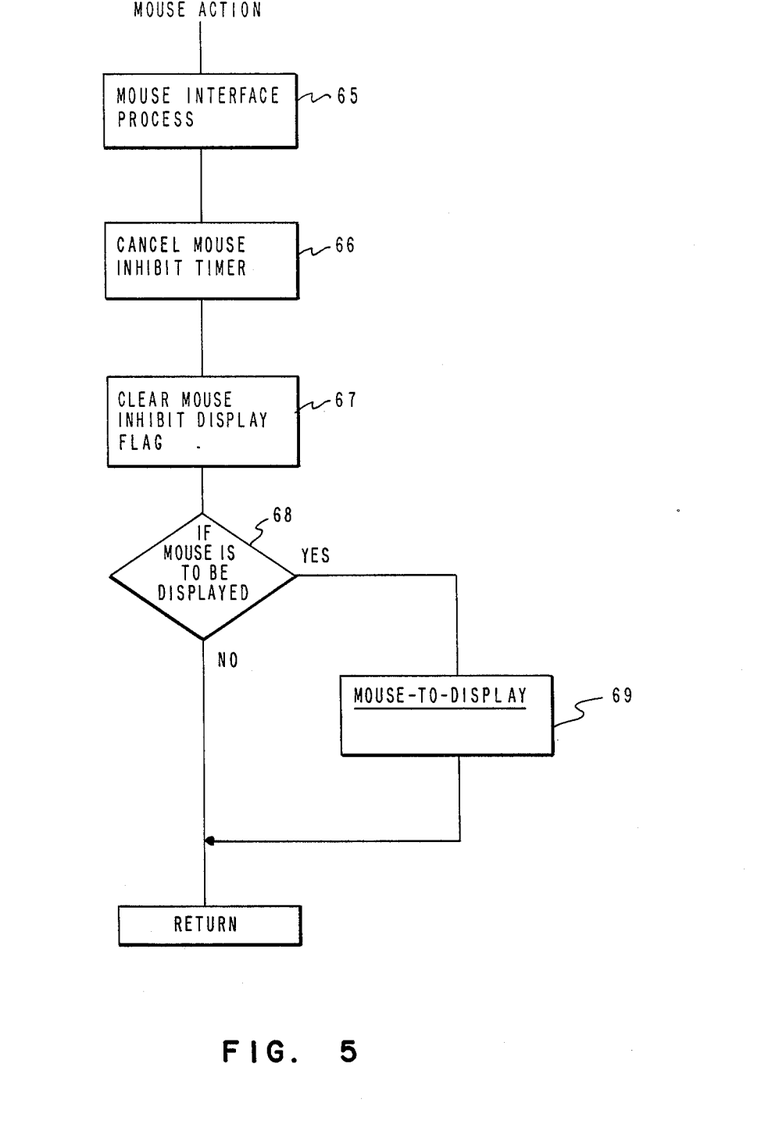
FIG. 5 is a flow diagram of the Mouse Interface process of FIG. 2.

Refer now to FIG. 5 for a flow diagram of the Mouse Interface process of FIG. 2. A mouse action, such as a mouse movement of a mouse button depression supplies information to the Mouse Adapter Interface Program 65. Program 65 may be, for example, the program included on a diskette with the Microsoft Mouse. Such a program returns information relative to mouse movements, mouse positions, and mouse button depressions to the application program, such as a word processing program, for which the mouse is used for data input and command selection. With the detection of a mouse event by the Mouse Adapter Interface Program 65, the Mouse Pointer Inhibit timer which was started at block 52, FIG. 4, is cancelled at block 66 and the Inhibit Mouse Pointer Display flag (which was set at block 51, FIG. 4) in the CI 23 is cleared. Then, at block 68 assuming that the mouse pointer is to be displayed in response to the detection of the mouse event, at block 69 the mouse position is sent to the visual display.

In certain instances it may be undesirable to display the mouse pointer, even though a mouse event has occurred. For example, the application may be in the middle of a display update when the asynchronous mouse action occurred. Thus, if the answer is "No" at block 68 the operation returns to the application without displaying the mouse pointer.

Those skilled in the art will also understand in FIG. 5 that the Mouse Inhibit time value is cancelled and the Inhibit Mouse Pointer Display flag is cleared at blocks 66 and 67, respectively, in order that the mouse pointer may be immediately redisplayed in response to a mouse action. This is generally desirable since, for any mouse action the operator would ordinarily want to immediately know the position of the mouse pointer.

The following programming design language listing is another form of the description of the above Mouse Interface process. This listing parallels the operation described above for FIG. 5.

```
BEGIN PROCESS Mouse_Interface;
.
.
. (retrieval of mouse information from the hardware
   and store into a common data area (Control Informa-
   tion)).
.
.
Set TIMER Mouse_Inhibit_Timer to CANCEL;
Set SWITCH Mouse_Inhibit_Display OFF;
IF Mouse_Hide_Counter is 0 THEN
Update display by placing the Mouse Pointer on the display;
ENDIF;
END PROCESS Mouse_Interface;
```

In FIG. 6 a flow diagram of the Mouse Inactivity Time Delay process 29 of FIG. 2 is shown. The output of a time base generator is used to decrement the Inhibit Mouse Pointer Time Delay value set (at block 52, FIG. 4) in the CI 23. For example, given a time base generator which completes eighteen periods per second and a desired time delay of 1.5 seconds, the time base generator 74 must decrement twenty-seven times before the requested delay of 1.5 seconds expires. When this requested delay has expired, the operation proceeds from block 76 to block 77 wherein the Mouse Inactivity Time Delay process is cancelled.

At block 78 the Inhibit Mouse Pointer display flag 78 in the CI 23 is reset. At block 79 a test is made to determine if the mouse pointer is displayable. If so, the mouse pointer is displayed as denoted by block 80. If not, or after display of the mouse pointer is enabled, the operation proceeds to the end of the time base generator process. At block 76, while the requested time delay has not expired, the time base generator 74 continues at block 75 to asynchronously decrement the Inhibit Mouse Time Delay value.

The following programming design language listing is another form of the description of the above Mouse Inactivity Time Delay process. This listing parallels the operation described above for FIG. 6.

```
BEGIN PROCESS Mouse_Timer;
    IF Mouse_Inhibit_Timer is not CANCEL THEN
    DECREMENT TIMER Mouse_Inhibit_Timer;
        IF Mouse_Inhibit_Timer is 0 THEN
        Set TIMER Mouse_Inhibit_Timer to CANCEL;
        Set SWITCH Mouse_Inhibit_Display OFF;
            IF Mouse_Hide_Counter is 0 THEN
            Update displayed mouse pointer on the display;
            ENDIF;
        ENDIF;
    ENDIF;
END PROCESS Mouse_Timer;
```

Figures 7A, 7B:
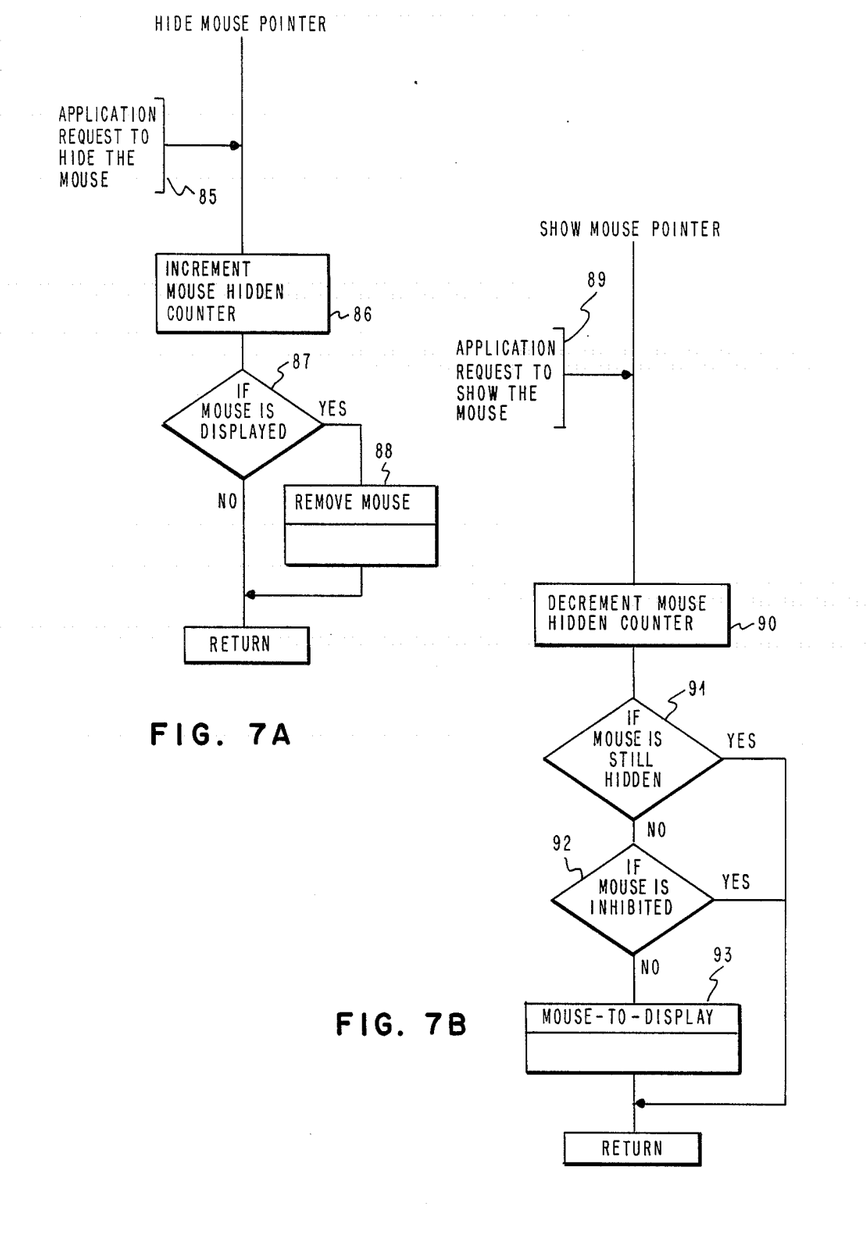
FIGS. 7a and 7b are flow diagrams of the Hide Mouse Pointer and Show Mouse Pointer processes of FIG. 3.

Refer now to FIG. 7a for a flow diagram of the process of hiding the mouse pointer as is called at: block 37, FIG. 3. If, at 85 an application request is received to hide the mouse pointer (as is the case at block 37, FIG. 3) then at block 86 the "mouse hidden" counter is incremented. At block 87 a test is made to determine if the mouse pointer is presently being displayed. If so, at block 88 the image of the mouse pointer is removed from the visual display. At block 87, if the mouse pointer is not presently being displayed there is no need to invoke the process of removing the mouse pointer at block 88.

The following programming design language listing is another form of the description of the above Hide Mouse Pointer process. This listing parallels the operation described above for FIG. 7a.

```
BEGIN Procedure HIDE_MOUSE;
INCREMENT Mouse_Hide_Counter;
    IF mouse is presently visible on the display THEN
    Update the display removing the mouse pointer;
    ENDIF;
END Procedure HIDE_MOUSE;
```

FIG. 7b shows a flow diagram of the process of showing the mouse pointer as is called at block 39, FIG. 3. In FIG. 7b, when the application program requests to show the mouse pointer at 89 the Mouse Hidden counter is decremented at block 90. At block 91 a test is made to determine if the mouse pointer is still hidden. If the mouse pointer is not still hidden a test is made at block 92 to determine if the mouse pointer is inhibited from being displayed. If not, the mouse pointer is displayed by block 93. If there is a reason that the mouse pointer is still hidden at block 91 or inhibited at block 92, the operation proceeds without displaying the mouse pointer at block 93.

The following programming design language listing is another form of the description of the above Show Mouse Pointer process. This listing parallels the operation described above for FIG. 7b.

```
BEGIN Procedure SHOW_MOUSE;
DECREMENT Mouse_Hide_Counter;
    If Mouse_Hide_Counter is 0 THEN
        IF SWITCH Mouse_Inhibit_Display is OFF THEN
        Update displayed mouse pointer on the display;
        ENDIF;
    ENDIF;
END Procedure SHOW_MOUSE;
```

In summary, with the present invention a mouse pointer is temporarily removed from a visual display screen when the first character from a keyboard, keyboard macro file, or other such input is being updated on the display screen. The mouse pointer is left hidden from the screen until the display updating event has been idle for a predetermined optimum period of time, such as about one to two seconds. This allows the operator to be periodically conscious of the mouse pointer position without annoying flickering or the performance impact inherent with the immediate redisplay of the mouse pointer after each keystroke or other, similar display updating event.

While the invention has been shown and described with reference to particular embodiments thereof, it will be understood by those skilled in the art that the foregoing and other changes in form and details may be made therein without departing from the spirit and scope of the invention.

We claim:

1. In a computer system having a keyboard, a visual display, and a pointing device, a method of displaying a pointer controlled by said pointing device on said visual display comprising:
   removing said pointer from a presentation on said visual display upon receipt by said system of an event generated by said keyboard; and
   displaying said pointer on said visual display after passage of a chosen time delay which begins in association with said event.

2. In the method of claim 1 wherein said event is a sequence of keystrokes in which any intervening idle period between said keystrokes in said sequence is shorter than said time delay.

3. In the method of claim 1 wherein said event is a valid event in which an application program can utilize said valid event.

4. In the method of claim 2 wherein said event is a stored sequence of keystrokes originally generated by said keyboard.

5. In the method of claim 2 further comprising:
   immediately displaying said pointer on said visual display upon the detection of an event generated by said pointing device.

6. In the method of claim 5 wherein said time delay is generated by:
   loading a first time value number in a random access memory; and
   periodically decrementing or incrementing said first number until a second number is detected in said random access memory.

7. In the method of claim 2 wherein said pointing device comprises a mouse.

8. In the method of claim 2 wherein said pointing device comprises a light pen.

9. In the method of claim 2 wherein said pointing device comprises a tablet.

10. In the method of claim 1 wherein said pointing device comprises a joystick.

11. In a computer system having a keyboard, a visual display, and a pointing device, the improvement for displaying a pointer controlled by said pointing device on said visual display comprising:
    means for removing said pointer from a presentation on said visual display upon receipt by said system of an event generated by said keyboard;
    means for generating a time delay which begins in association with said event; and
    means for displaying said pointer on said visual display after the completion of said time delay.

12. In the system of claim 11 wherein said event is a sequence of keystrokes in which any intervening idle period between said keystrokes in said sequence is shorter than said time delay.

13. In the system of claim 11 wherein said event is a valid event in which an application program can utilize said valid event.

14. In the system of claim 12 wherein said event is a stored sequence of keystrokes originally generated by said keyboard.

15. In the system of claim 12 further comprising:
means for immediately displaying said pointer on said visual display upon the detection of an event generated by said pointing device.

16. In the system of claim 15 wherein said means for generating said time delay comprises:

means for loading a first time value number in a random access memory; and
means for periodically decrementing or incrementing said first number until a second number is detected in said random access memory.

17. In the system of claim 15 wherein said means for generating said time delay comprises a hardward timer.

18. In the system of claim 12 wherein said pointing device comprises a mouse.

19. In the system of claim 12 wherein said pointing device comprises a light pen.

20. In the system of claim 12 wherein said pointing device comprises a tablet.

* * * * *